UNITED STATES PATENT OFFICE.

ADOLPH SOMMER, OF BERKELEY, CALIFORNIA.

NEUTRALIZING SULPHOCHLORINATED ORGANIC COMPOUNDS.

SPECIFICATION forming part of Letters Patent No. 419,726, dated January 21, 1890.

Application filed August 30, 1888. Serial No. 284,173. (Specimens.) Patented in England September 4, 1888, No. 12,795; in Belgium September 4, 1888, No. 83,139, and in France September 4, 1888, No. 192,770.

*To all whom it may concern:*

Be it known that I, ADOLPH SOMMER, a citizen of the United States, and a resident of Berkeley, in the county of Alameda and State of California, have invented a new and useful Improvement in Neutralizing Sulphochlorinated Compounds, (for which I have obtained Letters Patent as follows: in England September 4, 1888, No. 12,795; in Belgium September 4, 1888, No. 83,139, and in France September 4, 1888, No. 192,770;) and I do hereby declare that the following is an exact description of the invention, which will enable other chemists to perform the same operation.

When chloride of sulphur is mixed with organic substances (such as fats and oils) there is generally more or less chlorhydric acid formed and absorbed in the mixture. The removal of this acid I have previously effected by the addition of inorganic neutralizing agents, described in application Serial No. 209,637, filed July 31, 1886. Now I find that the same object can also be accomplished by means of certain unsaturated organic compounds, and especially by some of those volatile hydrocarbons which are classified among the terpenes and olefines. Although it has been long known that these hydrocarbons are capable of partially combining with hydrogen chloride, when this acid in the gaseous and undiluted state is conducted into them or into a strong solution of the same, it has been universally assumed that they are incapable of combining with this acid when it is presented in a highly dilute state; but while it is true that they are incapable of neutralizing aqueous solutions of hydrogen chloride, I find that they are well able to completely neutralize anhydrous substances of the character mentioned above, even when they contain only a fraction of one per cent. of acid.

Of the numerous compounds which belong to the terpenes and olefines, and which may be used for the purpose herein described, I will only mention those which, on account of their abundance and cheapness, are available for technical purposes. Of the terpenes the commercial oils of turpentine are generally the cheapest, and of the olefines I consider as the most available propylene, butylene, beta-amylene, beta-hexylene, and some of their isomeres and homologues. Generally it is not necessary that these compounds be pure. Any substance containing an appreciable quantity of them, provided it be not otherwise objectionable in the preparation to be neutralized, may be employed for this purpose. Thus, instead of employing the pure olefines, I use either a gas or a liquid obtained by the destructive distillation of some carbonaceous material, such as bituminous shale, lignite, peat, resins, and fats.

In order to enable the neutralizing agent to readily permeate the acid substance, the latter, if it be a solid, is either by melting or dissolving brought to the liquid state, or is reduced by grinding or otherwise to an even-grained coarse powder.

When a gas is chosen as the neutralizing agent, it is simply conducted in a slow and broken current into and through the acid substance until the escaping gas shows no trace of acidity, while in the case of a liquid agent I always take a somewhat larger quantity than is theoretically necessary to neutralize the acid, incorporate the same thoroughly with the acid substance, and allow the mixture to stand for some time.

The quantity of the substance containing the olefine or terpene which is theoretically sufficient for the neutralization of the acid depends upon the following factors: first, the kind of olefine or terpene present; second, the richness of the substance in olefines or terpenes; third, the degree of acidity of the preparation to be neutralized, and can for any given case be readily determined by a competent chemist.

The compositions thus obtained may be employed for the various purposes for which neutral sulphochlorinated compounds are adapted, and in which the presence of the unsaturated hydrocarbons or of their chlorhydric-acid derivatives is not objectionable. Of the purposes for which they are therefore suitable, I will mention their employment in the manufacture of paint-oils (Patent No. 396,774, of January 29, 1889;) in the manufacture of lubricants, (Serial No. 286,795, filed by me September 29, 1888;) of water-proof leather, (Serial No. 233,044, filed by me March 30, 1887,) and for adulterating and substituting india-rubber.

Having thus described my invention, what I claim, and desire to secure by Letters Patent, is—

1. The improvement in neutralizing organic sulphochlorinated compounds containing chlorhydric acid, which consists in digesting the compound with a volatile unsaturated hydrocarbon.

2. Sulphochlorinated fatty bodies holding in suspension or in solution the chlorhydric-acid derivatives of volatile unsaturated hydrocarbons, all substantially as described.

ADOLPH SOMMER.

Witnesses:
E. H. HANSON,
J. H. WHITHAM.